(12) United States Patent
Evehammar et al.

(10) Patent No.: US 11,165,998 B2
(45) Date of Patent: Nov. 2, 2021

(54) METHOD AND SYSTEM FOR ADJUSTING AN IMAGE PIPELINE SETTING

(71) Applicant: Axis AB, Lund (SE)

(72) Inventors: Michael Evehammar, Lund (SE); Andreas Johansson, Lund (SE); Mikael Starvik, Lund (SE); Stefan Ekenberg, Lund (SE); Adam Schill Collberg, Lund (SE); Henrik Fasth, Lund (SE); Magnus Martensson, Lund (SE); Martin Santesson, Lund (SE)

(73) Assignee: AXIS AB, Lund (SE)

( * ) Notice: Subject to any disclaimer, the term of this patent is extended or adjusted under 35 U.S.C. 154(b) by 65 days.

(21) Appl. No.: 16/717,490

(22) Filed: Dec. 17, 2019

(65) Prior Publication Data
US 2020/0204774 A1    Jun. 25, 2020

(30) Foreign Application Priority Data

Dec. 20, 2018 (EP) .................... 18214749

(51) Int. Cl.
*H04N 9/73* (2006.01)
*G06T 1/20* (2006.01)
*G06T 5/00* (2006.01)
*G06T 5/40* (2006.01)

(52) U.S. Cl.
CPC ............. *H04N 9/73* (2013.01); *G06T 1/20* (2013.01); *G06T 5/009* (2013.01); *G06T 5/40* (2013.01)

(58) Field of Classification Search
CPC ...................................................... H04N 9/73
USPC ........................................................ 348/223.1
See application file for complete search history.

(56) References Cited

U.S. PATENT DOCUMENTS

| 5,991,465 | A  | 11/1999 | Anderson et al. |
| 7,733,380 | B1 | 6/2010  | Cote et al.     |
| 8,605,169 | B2 | 12/2013 | Nishide         |
| 8,787,659 | B2 | 7/2014  | Paris et al.    |
| 8,988,563 | B2 | 3/2015  | Yanowitz et al. |
| 2009/0086076 | A1 | 4/2009 | Nishide et al. |

(Continued)

FOREIGN PATENT DOCUMENTS

| EP | 2727330 A1 | 5/2014 |
| EP | 2770477 A1 | 8/2014 |

(Continued)

OTHER PUBLICATIONS

Extended European Search Report dated Jun. 28, 2019 for the European Patent Application No. 18214749.6.

*Primary Examiner* — Joel W Fosselman
(74) *Attorney, Agent, or Firm* — Volpe Koenig (57) ABSTRACT

A method of determining adjustment of an image pipeline setting comprises determining, by a controller, one or more settings for image data processing in the image pipeline; associating the one or more settings with a tag; transmitting the one or more settings to the image pipeline, wherein the tag is transmitted in association with the one or more settings; transmitting, from the image pipeline to the controller, feedback regarding image data processed with the one or more settings, wherein the tag is transmitted in association with the feedback; and determining, based on the received feedback and the one or more settings associated with the tag, an adjustment of the image pipeline setting.

15 Claims, 6 Drawing Sheets

(56) References Cited

U.S. PATENT DOCUMENTS

2012/0162460 A1 6/2012 Gray
2013/0002898 A1* 1/2013 Tian ..................... H04N 19/593
                                                                348/222.1

FOREIGN PATENT DOCUMENTS

WO    2011/017651 A2    2/2011
WO    2013/003076 A1    1/2013

* cited by examiner

METHOD AND SYSTEM FOR ADJUSTING AN IMAGE PIPELINE SETTING

TECHNICAL FIELD

The present invention relates to the field of adjusting settings of an image pipeline, and in particular of how to determine an adjustment of an image pipeline setting in an efficient and reliable manner.

BACKGROUND

The art of video capturing includes acquiring and processing of digital image data to produce a digital video stream to, e.g., analyze or display to a user. Acquiring and processing are performed by a so called image pipeline which is an integral part of any camera system. For many camera systems today, the image pipeline is controlled by automated processes which adjust settings used in handling of image data in the image pipeline.

The image pipeline may be seen as including different components, or blocks; each handling a specific part in the pipeline. Non-limiting examples of parts that can be controlled in this manner are gain, exposure (shutter), white balance (WB), and encoding. From many of these components of the image pipeline, information about image data that is or has been processed by the components may be sent to some kind of controller. The information can for example be general or specific color information or different forms of pixel value distributions. Based on the information, the controller can determine that an adjustment of a setting of the component is needed in order to improve the capturing or processing. For example, if the controller receives information that indicates that a processed image frame is too dark, e.g. by that the number of pixel values below a certain threshold exceeds a limit, the controller may decide to increase the exposure time setting of an exposure time component. Based on next received image information of the same type, the controller may determine further adjustments. A feedback-based process for determining adjustments of image pipeline settings is thereby formed.

However, this process may be problematic to implement with satisfying results. On one hand, it is difficult to predict how much time it takes until a setting has been applied in the image pipeline, depending on the current processing load, and therefore one has to wait, in most cases, for an unnecessarily long time to be sure that the settings have had effect. One the other hand, not waiting long enough may lead to a setting adjustment that is determined based on information about image data for image data not processed with the settings. This introduces an undesired variation in the image characteristics such as color, exposure, gain, etc. Accordingly, a dynamically set balance between waiting time and risk of variation must be considered, which is difficult to achieve with satisfying result over time.

To make the problem even more complex, several setting adjustments may be determined, by the controller, at the same time. The settings may be related to different components in the image pipeline. This process introduces a synchronization problem, as discussed in U.S. Pat. No. 8,605,169 B2, but also makes the above discussed balance even more difficult to achieve. An even longer waiting time must be considered for all settings to have had effect, making the feedback process slower.

Hence, there is a need for improvement within this field.

SUMMARY

A method of determining adjustment of an image pipeline setting that can be made more time-efficient or more reliable, preferably both, is disclosed.

According to a first aspect, a method of determining adjustment of an image pipeline setting comprises:
  determining, by a controller, one or more settings for image data processing in the image pipeline,
  associating the one or more settings with a tag,
  tag is transmitted in association with the one or more settings,
  transmitting, from the image pipeline to the controller, feedback regarding image data processed with the one or more settings, wherein the tag is transmitted in association with the feedback, and
  determining, based on the received feedback and the one or more settings associated with the tag, an adjustment of the image pipeline setting.

The concept relies on the realization on using a tag that is associated with a setting and, when the setting has taken effect in the image pipeline, associate feedback of image data, processed with that setting, with the tag. The controller can thereby know which setting that the feedback relates to, and does not need to rely upon an estimation that the setting should have taken effect after a certain time. By the inventive concept, there is no longer a need for time estimation, handling of time count, or waiting a certain time, for settings that are determined. Moreover, the adjustment method is very reliable in that the controller will with certainty know which setting that received feedback is related to.

As will be disclosed in more detail hereinafter, the controller may comprise units for implementing different functionality. For example, a control unit may be provided for determining setting adjustments, and a driver unit may be provided for transmitting determined settings to the image pipeline.

The image pipeline setting which is adjusted may be included in the one or more settings. Hence, in such an embodiment, the method may comprise determining an adjustment of the one or more settings. Alternatively, the image pipeline setting may be a setting for another component in the image pipeline than the one or more settings takes effect in. For example, the one or more settings may include a gain setting. Based on feedback concerning the light level in image frames or image frame parts processed with the gain setting, an exposure setting may be adjusted instead of the gain setting to, for instance, increase the light level in future image frames. Another non-limiting example is adjustment of an exposure time setting based on feedback provided by a white balance component. In yet another non-limiting example, feedback providing indication of the (color) intensity information of processed images is used for determining an adjustment for other components handling noise filtering, color correction, gain, or contrast enhancement.

The one or more settings may be transmitted to the image pipeline, i.e. to one or more components thereof, as a data bundle, optionally together with additional data which can include the tag. Alternatively, the tag can be transmitted separately, and the association can in that case be made via a logical connection.

As used herein "image pipeline" means any part of a capturing or processing device for digital imaging that have impact on the capturing/acquiring or processing of image data. The image pipeline can be divided into different components, each handling a different part of the acquiring or processing. Some components may be located in an image sensor part of a camera system, and some components may be located in a processing part of the camera system. An encoder can be seen as an additional component which is also part of the image pipeline. From the image pipeline is output, in the typical case, an image data stream in the form of a video stream with encoded image frames or image frame parts that represent the captured video of a scene. As will be disclosed and exemplified, the method may be implemented in systems having a single or a plurality of image pipelines. In the case of a single image pipeline, the output from the pipeline is typically a whole frame. In the case of a plurality of image pipelines, each pipeline may process a different image data part that together form, after the image processing by the plurality of image pipelines, a whole image frame. If the image pipeline, which the method is applied to, processes a part or a whole image frame does not have any effect on the method. Thus, the term "frame" as used within the present application should be constructed as covering both a whole image frame and a part of a whole image frame.

As used herein "tag" means some type of identification that identifies the one or more settings for the controller. For example, the controller may have sent several data bundles, each containing one or more settings, and each being associated with a tag, wherein the tags are identifiable relative each other. The tag may be semantic, such as a label "A", "B", etc., or numerical, such as "001", "002", etc. The tag may comprise or consist of a time stamp received from a timer included in a camera system. The tag may also, or instead, be formed of a value of the one or more settings that the tag is associated with. For example, the tag may comprise an exposure time value, partly or in full, that is included in an exposure setting. Moreover, the tag must not be uniquely identifiable over time, but at least identifiable relative other entities of one or more settings that are active at the same time in the adjustment process. When a first setting is overwritten by second setting in a component of the image pipeline, the first setting can be said to be inactive.

The method may be performed iteratively. In other words, the step of determining an adjustment of the image pipeline setting may be part of the initial step of determining one or more settings in the next cycle of the method. Hence, the adjustment of the image pipeline settings is an iterative process that may adjust different settings based on feedback that is regularly sent from the image pipeline to the controller.

It is noted that transmitting feedback regarding image data is a well-known feature of an image pipeline. As will be evident from the description herein, several (all well-known) types of image data feedback exist and may be used.

In one embodiment, the one or more settings comprise a group of settings, meaning that a plurality of settings are formed by the controller to be transmitted to the image pipeline. The group of settings may be seen as an entity of settings. The group of settings may be determined based on image data feedback received in one or more earlier cycles of the method. Preferably, the group of settings should take effect for handling (acquiring and/or processing) of (the) same image data. Since a group of settings may contain settings for different components in the image pipeline, which processes data successively, the application of the group of settings in the image pipeline must be coordinated. Moreover, different settings may require different amounts of image data to take effect. In other words, one setting type may take effect over one or two image frames while another setting type may need three image frames to take effect. For these purposes, the method may further comprise determining a timing for applying the group of settings such that each of the settings takes effect for processing of (the) same image data, wherein the group of settings is transmitted to the image pipeline according to the determined timing. Moreover, the tag is transmitted in association with at least one setting in the group of settings.

In other words, a synchronized application of the group of settings is performed.

By (the) same image data is meant the same data package. The size of a data package may depend on many factors, such as how the data flow structure of the image pipeline is formed. In one embodiment, the same image data corresponds to a same image frame or image frame part, which is the image data acquired by an image capturing device at a given moment (i.e. at the same time).

As implied, the tag may be transmitted in association with one setting or a sub-group of settings within the group of settings.

Hence, in one embodiment, the tag is transmitted together with each of the settings within the group of settings to different image processing components of the image pipeline. In this way, each component receiving a setting will be able to associate feedback of image data processed, using the received setting, with the tag without further actions.

Alternatively, the tag may be transmitted, in association with a first setting of the one or more settings, to an image processing component in the image pipeline. In such an embodiment, the tag may be transmitted to later image processing components via image data that is transferred between components in the image pipeline. The tag may be included in the image data in itself (i.e. via pixel values) or, e.g., as metadata. In one embodiment, the tag is transmitted with the setting that is related to a component located earlier in the image pipeline than the components related to the other settings in the group. Hence, the tag will in that case be transmitted to all the other (later) components together with the image data.

In yet another embodiment, the tag is transmitted in association with each of the settings and, in addition, is transmitted via image data to other components in the image pipeline as well. The tag can thereby be sent in association with feedback from the other components.

A further advantage with an embodiment in which the tag is transmitted via image data is that the component may know, when receiving image data including the tag, that a setting of the same group for a preceding component has taken effect. This can be a trigger, or verification of the set timing, to implement the setting of the current component.

In one embodiment, the tag includes unique data identifying the one or more settings. By unique is meant a tag that provides an identification that will not reoccur for other tags over time. An example of a unique tag is a combination of letters and numbers that is formed by any commercially available algorithm for creating unique sequences.

The feedback may comprise image statistics, such as block level data or histogram data. Alternatively, the feedback may comprise processed, or partly processed, image data in the form of image frames. Different types of feedback, with examples, will be disclosed in detail in the detailed description.

Non-limiting examples of image pipeline components are: gain, exposure (shutter), pre-processing (e.g. remove effects, such as dead pixels, caused by sensor defects), white balance (WB), post-processing (e.g. noise filtering, contrast enhancement, sharpening), and encoding. Other components of the image pipeline may handle demosaicing, color correction, and tone mapping.

In one embodiment, the one or more settings comprise a plurality of settings that are divided into a first group of settings and a second group of settings. The first group of settings is selected to be applied in processing of image data of a first iteration. The second group of settings is selected to be applied in processing of image data of a second iteration. The first and second group of settings may comprise settings of the same type. For example, the first group of settings may comprise a first gain setting and a first filter setting to be applied in processing of image data of the first iteration, and the second group of settings may comprise a second gain setting and a second filter setting to be applied in processing of image data of the second iteration.

The method may, in this embodiment, further comprise transmitting, in association with the feedback and the tag, information of which iteration the processed image data is of. Hence, the controller receives feedback together with the tag and which iteration the feedback is based on. By the combination of the tag and the iteration information, the controller knows which settings have been active when processing the image data of the feedback.

Alternatively, the plurality of settings may be associated with a plurality of tags, that is one for each group of settings. In that case, feedback sent from a component is associated with the tag from which the controller may know which iteration the tag relates to. A simple way to implement this way of tagging, is to assign different tag characteristics to different iterations. For example, groups of settings for a first iteration may be associated with tags in the form of odd numbers and groups of settings for a second iteration may be associated with tags in the form of even numbers.

Based on the received feedback and the one or more settings associated with the tag in combination with the iteration information, the controller may determine an adjustment of an image pipeline setting to be applied to the same iteration. Hence, adjustments of settings for one iteration, and not other iterations, based on feedback which, with certainty, is based on processed image data of that iteration, is enabled.

It is noted that this embodiment may be combined with a synchronized application of a group of settings, as disclosed as another embodiment above. In other words, the one or more settings may comprise one or more groups of settings and a timing for applying the settings within each of these groups of settings may be determined such that the settings within a group takes effect for same image data.

By the term iteration is meant, within the context of this application, image pipeline processing cycles that are performed iteratively and with different settings for at least one component in the pipeline. As an example, processing of different iterations may be performed alternately.

A non-limiting example of an image pipeline adapted for different iterations is one that is adapted to produce high dynamic range (HDR) images. Such images are based on a well-known technique of acquiring image data with different exposure times. The image data of different exposure times are processed in different iterations.

In an alternative embodiment, the one or more settings comprise a plurality of settings of the same type but for different iterations. For example, the plurality of settings may include a first filter setting for a first iteration and a second filter setting for a second iteration. The plurality of settings may be transmitted to a filter component of the image pipeline, in association with a tag and iteration information, in accordance to what has been described for embodiments above. The same principles and advantages of the use of a tag and indication information that have been disclosed above, applies to this embodiment as well.

According to a further aspect, there is provided a computer-readable storage medium having computer code instructions stored thereon which, when executed by a processor, causes the processor to carry out the method according to the first aspect. The storage medium may be a non-transitory storage medium.

According to a further aspect, a system for determining an adjustment of an image pipeline setting comprises:
an image pipeline adapted to process image data, and
a controller adapted to:
determine one or more settings for image data processing in the image pipeline,
associate the one or more settings with a tag,
transmit the one or more settings to the image pipeline, and transmit the tag in association with the one or more settings.

The image processing pipeline is further adapted to transmit feedback regarding image data processed with the one or more settings to the controller, and transmit the tag in association with the feedback. The controller is further adapted to determine, based on the received feedback and the one or more settings associated with the tag, an adjustment of the image pipeline setting.

The system of this further aspect may generally be embodied in the same ways as the method of the first aspect with accompanying advantages.

In one embodiment, the one or more settings comprise a group of settings. The controller may in that case be further adapted to:
determine a timing for applying the group of settings such that each of the settings takes effect for processing of the same image data,
transmit the one or more settings to the image pipeline by transmitting the group of settings to the image pipeline according to the determined timing, and
transmit the tag in association the with at least one setting in the group of settings.

A synchronized application of the group of settings is thus achieved.

The system may further comprise an image sensor adapted to acquire the image data. The image sensor may be adapted for any type of imaging, including visual light imaging and thermal imaging. Alternatively, the system may further comprise a ranging sensor, for example a radar unit, that is adapted to acquire the image data.

The image pipeline may be adapted to perform image data processing selected from the group of: gain, exposure, pre-processing, white balance, filtering, post-processing, and encoding.

A further scope of applicability will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the embodiments are not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The embodiments will now be described in more detail by way of example and with reference to the accompanying schematic drawings, in which.

DETAILED DESCRIPTION OF EMBODIMENTS

Figure 1:
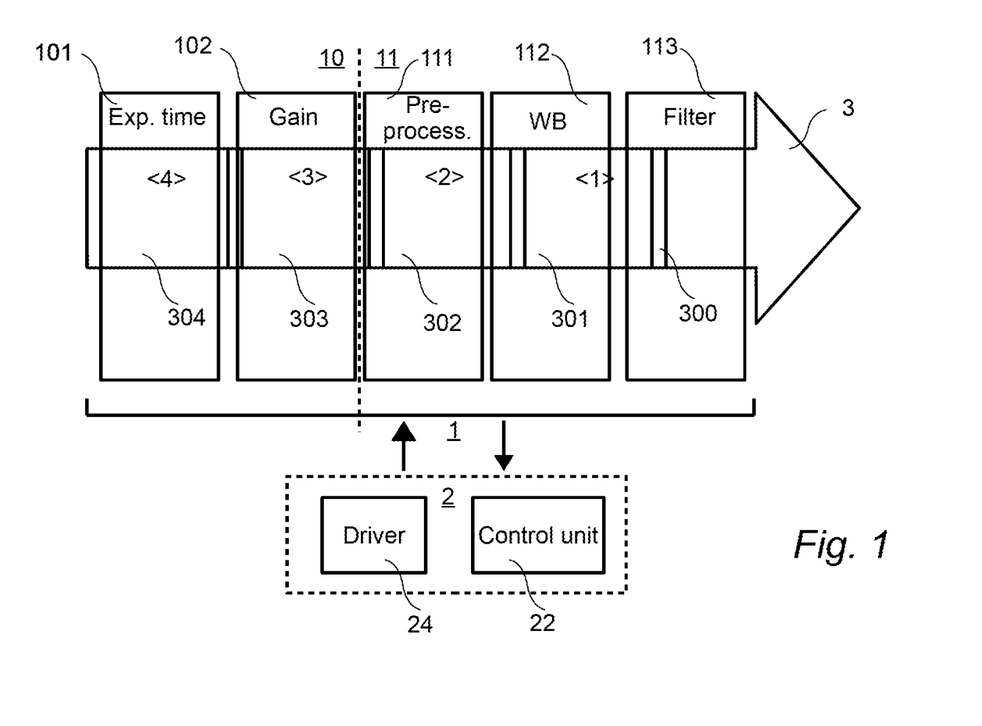
FIG. 1 is an overview of an image pipeline according to an embodiment.

FIG. 1 provides an overview of an image pipeline 1. The image pipeline 1 may be part of a camera system, such as a thermal camera system or a visual light camera system. The camera system may be a monitoring camera system. As the skilled person recognizes, an image pipeline may take various forms and is not limited to the ones exemplified herein. Hence, the present description may be applied to various forms of image pipelines in a variety of camera applications.

The image pipeline 1 is constructed for handling an image data stream 3 comprising image data in the form of image frames 301-304. Between each image frame, intermediate data 300 is provided as a buffer and may also include peripheral data such as metadata or supplementary image data. The handling involves image data acquiring, performed in a sensor part 10, and sub-sequent image data processing, performed in a processing part 11. The processing part 11 may be implemented as a chip. The sensor part 10 and the processing part 11 may be implemented in a structurally separated way, meaning that the sensor part 10 may perform its operation on a first device (not illustrated) and transmit image data to a second device (not illustrated) for processing by the processing part 11.

The image pipeline 1 comprises components for the image data handling. These components are exemplified in FIG. 1 as an exposure time component 101, a gain component 102, a pre-processing component 111, a white balance (WB) component 112, and a filter component 113. The names indicate their respective mechanism, namely control of exposure time (101), applying gain (102), adjusting white balance (112), and applying filter (113). The mechanism in each component is controlled by a setting, or a set of settings, that is stored in each component. A storage location for one or more settings of a component is sometimes referred to as a register.

In an image pipeline 1, it is desirable to be able to adjust these settings to adapt the image data to different parameters, such as scene properties (e.g. amount of available light, motion, colors), limitations (or desired decrease) of data transmission, or user-initiated requests of change in image data characteristics. For this purpose, a controller 2 is provided, including a control unit 22 and a driver 24. The control unit 22 and the driver 24 are here illustrated as separate devices for illustrative purposes, however it is appreciated that these may be implemented together in a single device. The controller 2 may comprise circuitry which is configured to implement the control unit 22 and the driver 24 and, more specifically, their functionality.

In a hardware implementation, each of the control unit 22 and the driver 24, may correspond to circuitry which is dedicated and specifically designed to provide functionality of the parts. The circuitry may be in the form of one or more integrated circuits, such as one or more application specific integrated circuits or one or more field-programmable gate arrays.

In a software implementation, the circuitry may instead be in the form of a processor, such as a microprocessor, which in association with computer code instructions stored on a (non-transitory) computer-readable medium, such as a non-volatile memory, causes the controller 2 to carry out (part of) any method disclosed herein. Examples of non-volatile memory include read-only memory, flash memory, ferro-electric RAM, magnetic computer storage devices, optical discs, and the like. In a software case, the control unit 22 and the driver 24 may thus each correspond to a portion of computer code instructions stored on the computer-readable medium, that, when executed by the processor, causes the controller 2 to carry out the functionality of the component.

As indicated in FIG. 1, a bidirectional stream for data exchange is provided between the image pipeline 1 and the controller 2. From the image pipeline 1, feedback is sent to the control unit 22, and from the driver 24, updated settings for different components are sent to the image pipeline 1. The feedback may consist of image statistics that can be seen as data providing a condensed representation of processed image data at different stages (at different components) in the image pipeline 1. Such feedback is typically provided by the processing part 11 of the image pipeline 1. However, in some cases, also the sensor part 10 of the image pipeline 1 may provide feedback to the controller 2. Based on the feedback, the control unit 22 decides on adjustment of one or more settings which are sent to the driver 24 for transmittal to the image pipeline 1.

Figure 2:
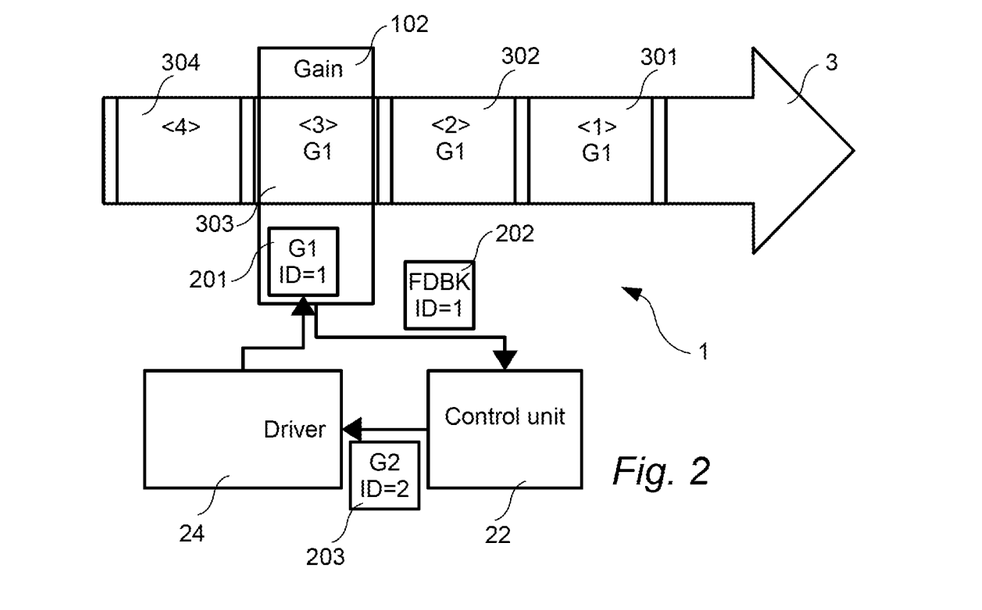
FIGS. 2-4 illustrate an embodiment for adjusting a single setting.
Figure 3:
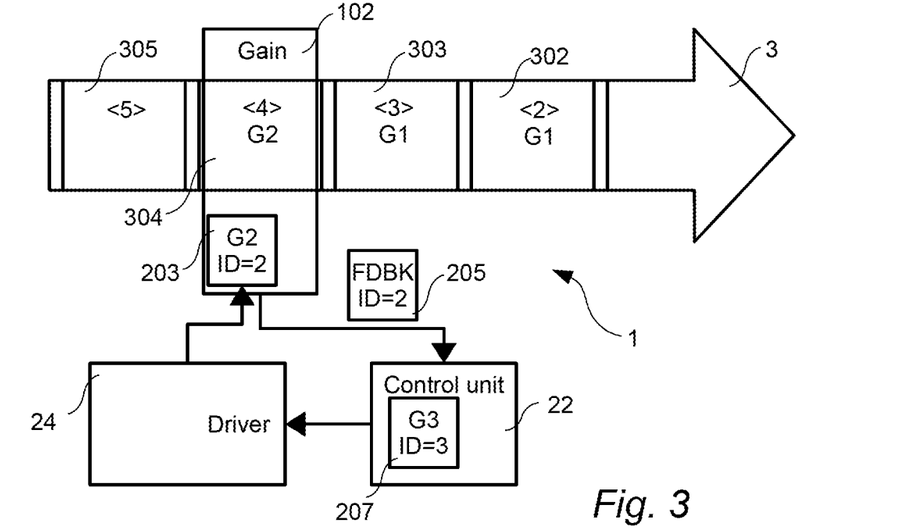
Figure 4:
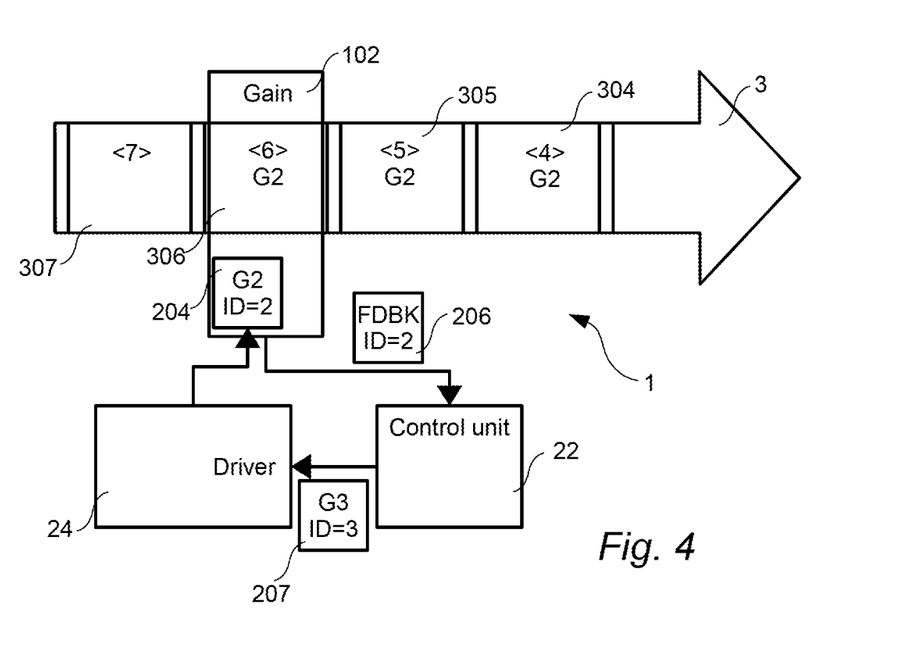

Going more into detail, FIGS. 2-4 illustrate a first embodiment. The figures illustrate the image pipeline 1 at different (consecutive) moments when the image data stream 3 is passed through. To emphasize the principles herein, only one component, namely the gain component 102, is illustrated and the other components are left out from these figures. The embodiment is not limited to the gain component 102, and may be adapted to work for other components in the image pipeline 1 as well. Moreover, the arrows of the figures illustrate in which directions data may be transmitted, and does not necessarily mean data is currently transmitted.

Starting in FIG. 2, the image frames 301 and 302 have passed through the gain component 102 and the image frame 303 is under processing. The current gain setting 201 is G1, meaning that the gain component 102 processes the image data stream 3 with the setting G1 which, e.g., indicates the amount of gain that is applied to pixel values of the image data in an image pipeline. The image pipeline 1 transmits feedback (FDBK) 202 to the control unit 22. Here the feedback 202 is illustrated as coming from the gain component 102. However, it is understood, that the feedback may generally come from any component(s) in the image pipeline 1. Specifically, a setting may be adjusted based on feedback from the component in the image pipeline 1 to which the setting pertains or from any subsequent component in the image pipeline 1. In this case, the feedback may hence come from any component which is subsequent to the gain component 102 in the image pipeline 1. The feedback 202 may include image statistics, for example block statistics in the form of pixel block average/variance/median values or histogram data. A non-limiting example of block statistics is obtaining a color value for each 16×16 pixel block of the image data. This can be seen as a reduced/condensed representation of the image data. A non-limiting example of histogram data is information on the number of pixels per, e.g., light intensity level. Various types of well-known image statistics, also of other types than block statistics and histogram data, that are suitable for various purposes exist and is readily available for the skilled person.

The control unit 22 has, based on earlier received feedback, determined an adjustment of the gain setting from G1 to G2. The purpose of the adjustment may be to change image characteristics, such as noise or light level, of image data that is processed by the gain setting. Another purpose may be that more or less gain is required for adapting the bitrate of a resulting data stream of image data output from the image pipeline. The adjustment may be determined based on user-input or by other parts of the image system, such as by an encoder. These purposes are applicable to the concept in general. It is also noted that the adjustment, in general, is a well-known image pipeline process. However, the addition of a tag, according to the inventive concept, improves known ways and methods of how to adjust settings of the image pipeline and adds further benefits such as enabling a faster adjustment process.

The adjustment may be performed based on target image characteristics which are affected by the setting. The control unit 22 may compare the received feedback 202 to target image characteristics and adjust the settings on basis thereof. For example, if the received feedback 202 indicates that image data of a processed image frame is darker than a target value, the control unit 22 may increase the gain from G1 to G2 to increase the light level in future image frames. In that way, the control unit 22 may adjust the settings to cause the image characteristics to reach their target values. A target value for the settings itself may be set, wherein the control unit 22 aims to reach the target value when adjusting the setting. The target image characteristics and/or the target value for a setting may be set based on user-input or by other parts of the image system, such as by an encoder, for achieving certain characteristics of the image data.

The adjusted gain setting 203 (being G2) is sent from the control unit 22 to the driver 24 for implementation in the image pipeline 1. The adjusted gain setting 203 is associated with a tag in the form of an ID number (being "2" for the case of the adjusted gain setting 203). The association may be implemented by that the tag is sent together with the adjusted gain setting 203, i.e. in the same data package. Moving forward to FIG. 3, the driver 24 has sent the adjusted gain setting 203 to the gain component 102 which implements it and uses it for processing of the image frame 304. The ID is transmitted in association with the adjusted gain setting 203 to the gain component 102. Moreover, with the adjusted gain setting 203 active for processing of image data, second feedback 205 is sent from the gain component 102 to the control unit 22. This feedback 205 is based on the image frame 304, not the previously processed image frames 302, 303. In association with the second feedback 205, the ID is sent to the control unit 22. When receiving the second feedback 205, with the associated ID, the control unit 22 knows, from the association between the ID and the setting G2 that the second feedback 205 is based on image data processed with the setting G2. The association between different tags (in this case IDs) and settings may be stored in a memory of the control unit 22 or in a memory remotely accessible to the control unit 22.

With this information at hand, i.e. the second feedback 205 and the knowledge of which gain setting is used for processing of the image data on which the second feedback 205 is based, the control unit 22 may now make a well-founded determination for the next adjustment of gain setting that is to be applied, namely an adjustment from G2 to G3 as indicated by gain setting 207. Before transmitting this gain setting 207 to the driver 24 for implementation, the gain setting 207 is associated with a tag, in this case being an ID number "3". A unique tag (ID number in this case) is chosen, at least relative all settings that are active at the moment. In this example, only the gain setting G2 with ID number "2" is active so any other ID number than "2" would suffice. However, in a real implementation, hundreds of different settings (for different components) may be active. Preferably, and when also keeping historical information about settings that have been applied (together with their tags), the tag should also be uniquely selected with respect to inactive, but previously implemented, settings.

Moving forward to FIG. 4, the further gain setting 207, including G3 and associated with ID number "3", is sent to the driver 24. The control unit 22 receives third feedback 206 from the gain component 102. At this moment, the control unit 22 would, without the tag, not know if the third feedback 206 is based on image data processed with the setting G2 or G3. However, with the tag that is associated with the third feedback 206, namely ID number "2", the control unit 22 knows that the third feedback 206 still relates to image data processed with the gain setting G2. In this way, the method provides a time-efficient method for adjustment where the control unit 22 does not need to estimate how much time it takes for a setting to have effect, which is complex in itself, and handle different timers for all different settings that are active. Moreover, the control unit 22 may, by receiving feedback with a tag having the ID number "3", know that the previous setting G2 has been overwritten in the gain component 102 and hence the control unit 22 may set that settings as inactive in the memory of settings. The tag of an inactive setting may be reused to save processing power and memory.

Moving forward, FIGS. 5-9 illustrate a second embodiment. Here, the concept as explained with the example of the first embodiment will now be applied to a more complex scenario. However, the main principles of the concept still apply, that is to tag setting(s) that are implemented in an image pipeline and correspondingly tag feedback determined for image data processed with that settings.

Figure 5:
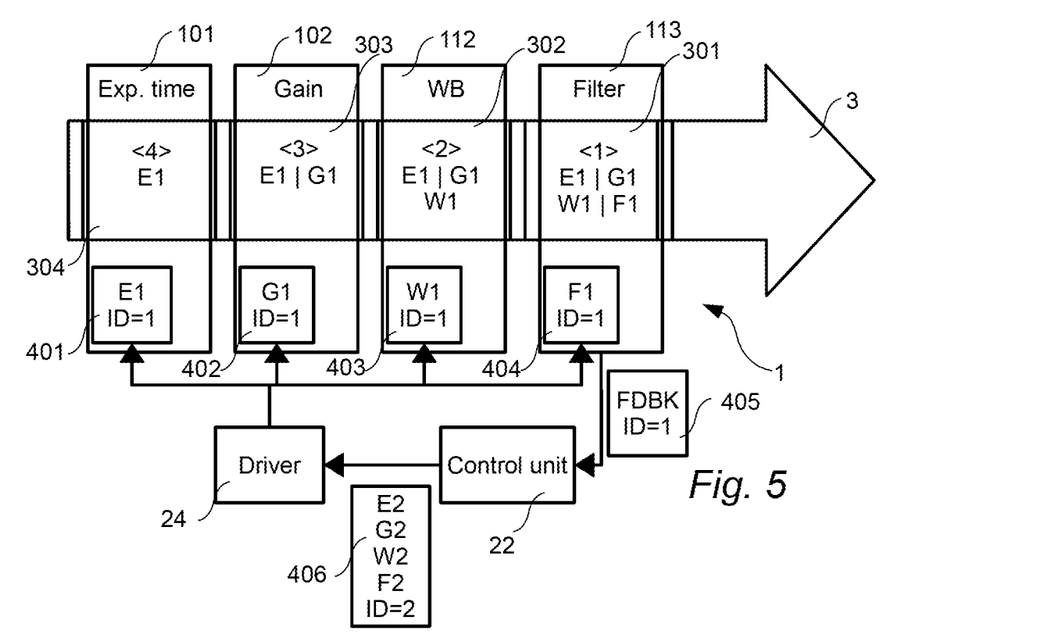
FIGS. 5-9 illustrate another embodiment for adjusting a group of settings.

Starting in FIG. 5, the image pipeline 1 is exemplified with components exposure time component 101, gain component 102, white balance component 112, and filter component 113. Through these components the image data stream 3, with image frames 302-305 flows. At the moment in time which FIG. 5 illustrates, the different components handle the image data stream 3 using exposure time setting 401 E1, gain setting 402 G1, white balance setting 403 W1, and filter balance setting 404 F1. In this context, it may be emphasized that the settings do not necessarily correspond to numerical values. In the case of a filter, properties of a certain filter or a certain filter type to apply in the filter component 113, may be included in the filter setting.

All settings 401-404 are associated with a tag in the form of an ID number "1" and these associations are made as disclosed for the first embodiment. Consequently, feedback 405 provided by the image pipeline 1, in the illustrated case from the filter component 301, is associated with the ID number "1", letting the control unit 22 know that the feedback 405 relates to image data that is processed with settings associated with that ID number.

A group of settings 406, including an exposure time setting, a gain setting, a white balance setting, and a filter setting, has been determined by the control unit 22 and is sent to the driver 24. Moving forward to FIG. 6, the driver 24 has received the group of settings 406. The driver 24 now has an additional functionality, when it comes to a group of settings that is to be implemented in different components in the image pipeline 1, namely synchronizing the implementation of the group of settings such that the settings takes effect for processing of the same image data, preferably the same image frame. In this way, the resulting image stream will change with respect to corresponding characteristics all at once and not one at a time, which can be beneficial both for analytic purposes but also for providing an image stream that is more pleasant to look at for a user. In order to achieve synchronization, the driver 24 determines a timing for applying the group of settings 406. How to decide this timing is straight-forward when knowing parameters such as how the components are ordered and how long it takes for each component to apply a setting. The timing may also be decided based on dynamic parameters, such as current latency, in the image pipeline.

Figure 6:
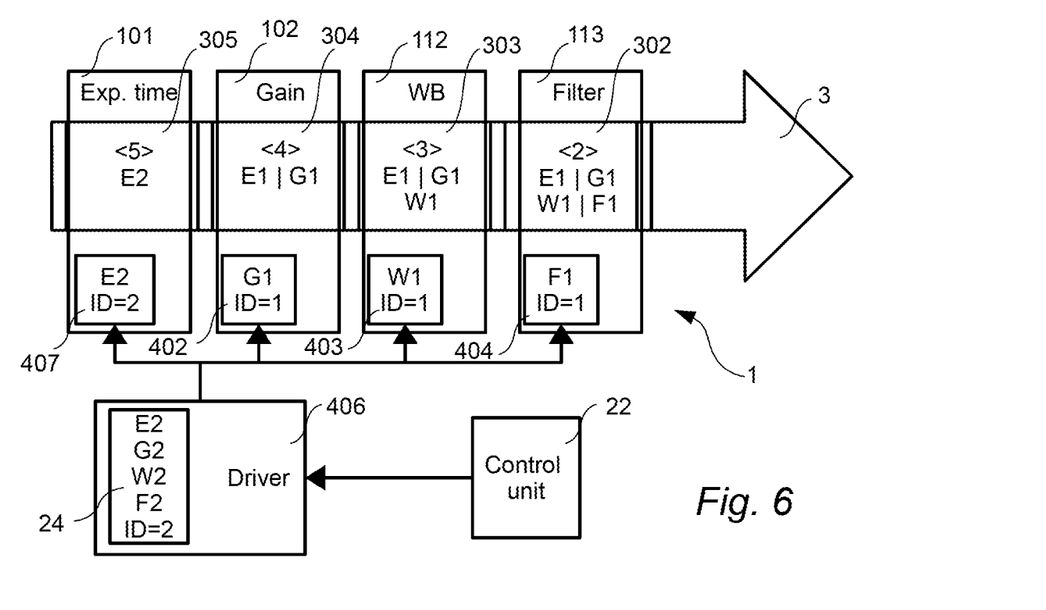
Figure 7:
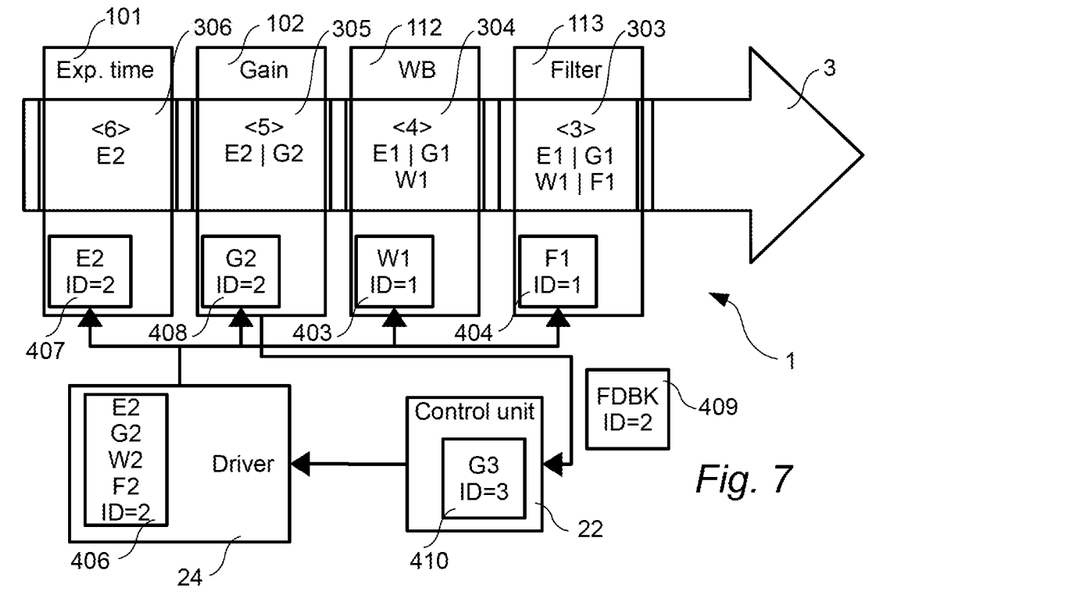

In FIG. 6, exposure time setting 407 has been applied, meaning that the driver 24 has transmitted the setting E2 to the exposure time component 101. Moving forward to FIG. 7, gain setting 408 has been implemented in a corresponding manner, and takes effect for processing of the image frame 305. As also illustrated in this figure, feedback 409 is sent from the gain component 102 to the control unit 22 with an associated tag of ID number "2". The control unit 22 has started to form a second group of settings 410 that is to be filled with further settings.

Figure 8:
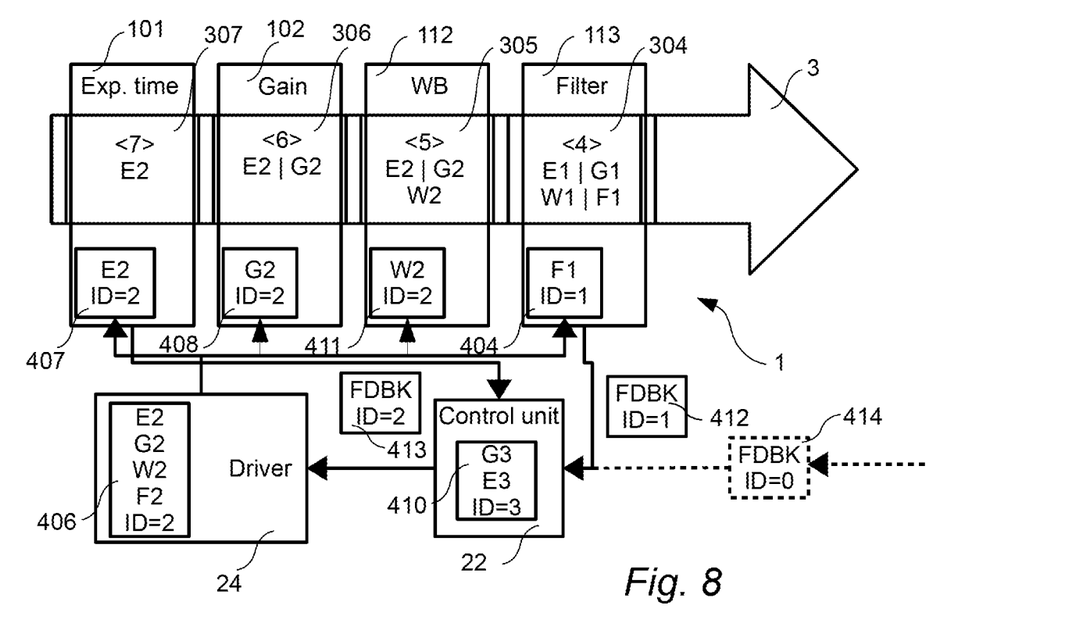

Next, in FIG. 8, a white balance setting 411 has been implemented in the white balance component 112. Moreover, third feedback 412 is sent from the filter component 113 to the control unit 22, and fourth feedback 413 is sent from the exposure time component 101. The third feedback 412 is associated with ID number "1" and the fourth feedback is associated with ID number "2". Accordingly, the control unit 22 may separate these two feedbacks as being based on image data being processed with different settings. The control unit 22 also knows which settings that have been used, which can be utilized in the analysis. Without the tag as set forth above, the separation would not have been possible and the control unit 22 would possibly need to discard both feedbacks 412, 413 since it does not know what they are based on. The control unit 22 is hence provided with a larger amount of, and more reliable, feedback information. In addition, as illustrated in FIG. 8, the control unit 22 receives fifth feedback 414 from the image pipeline in the form of image data that is fully or partly processed. Hence, this is not a condensed form of the image data but could for example correspond to an image frame. The fifth feedback 414 is associated with a tag in the form of an ID number "0" indicating that it has been processed using settings associated with that tag. In some embodiments, it is beneficial for the control unit 22 to regularly receive feedback in the form of image data to perform certain analyses.

As can also be noticed in FIG. 8, the control unit 22 continues to build the second group of settings 410.

Figure 9:
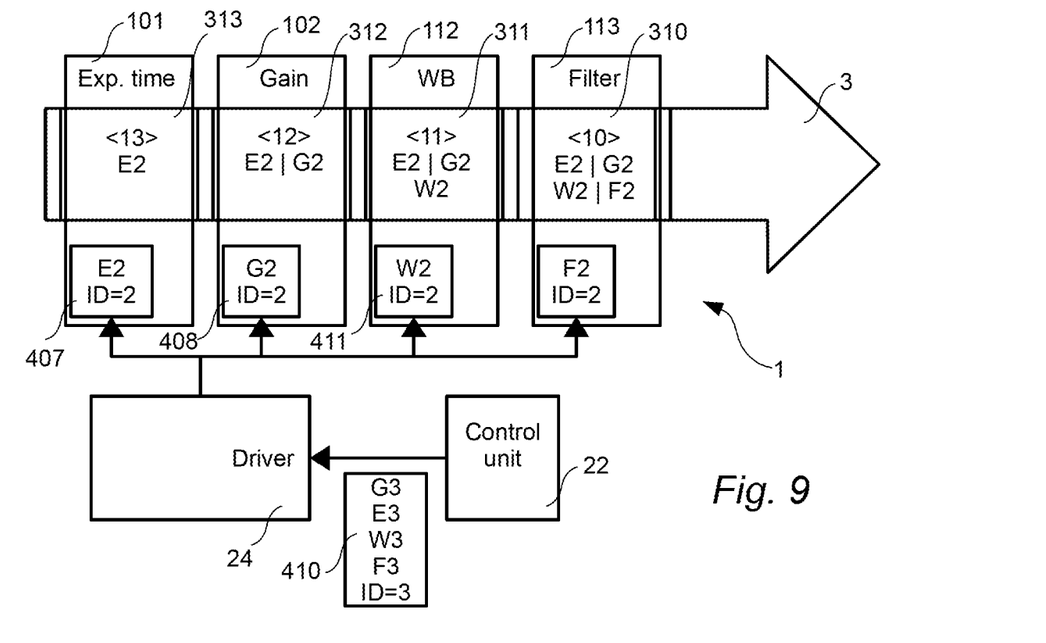

Going forward some image frames, FIG. 9 illustrates a moment where all settings in the group of settings 406 have been implemented in the image pipeline 1. At this moment, the control unit 22 has finished its determination of the second group of settings 410 and sends it to the driver 24 for implementation.

Figure 10:
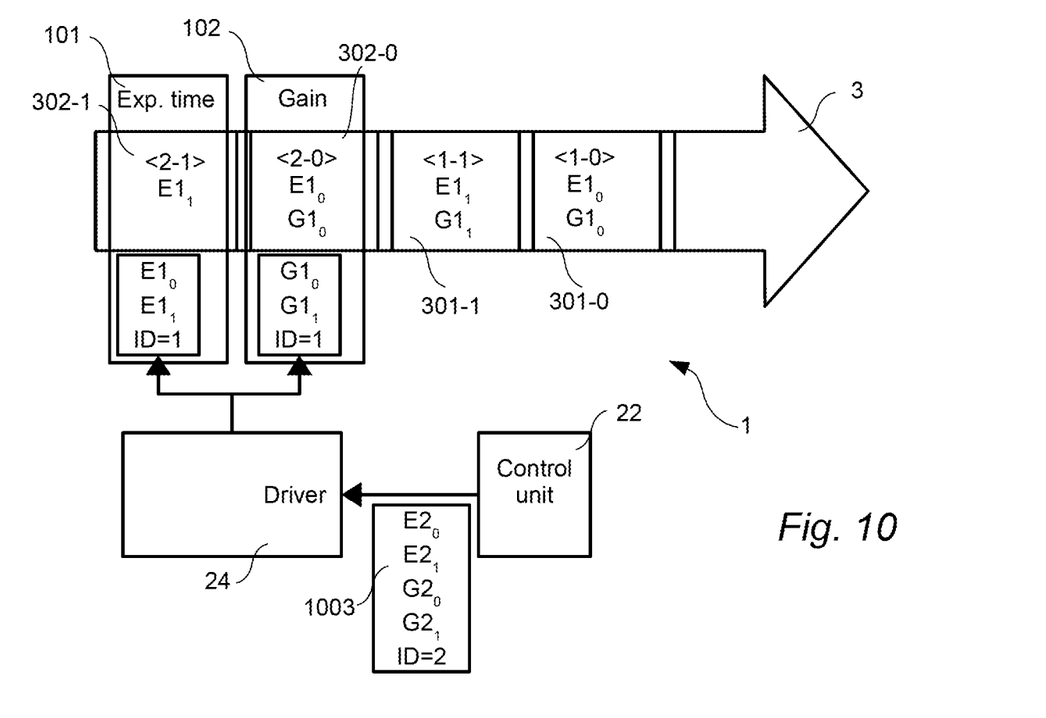
FIG. 10 illustrates yet another embodiment of an image pipeline producing high dynamic range images.

The above concepts may be extended to even more complex scenarios. FIG. 10 illustrates a scenario where the image pipeline 1 is adapted to process image data of two different exposure times, handled in a first iteration 0 and a second iteration 1. By the term iterations is meant pipeline processing cycles that are performed iteratively and with different settings for at least one component in the pipeline. In the example of FIG. 10, two iterations are performed with different settings for the exposure time component 101 and for the gain component 102. The exemplified image pipeline is adapted to produce high dynamic range (HDR) images (also known as wide dynamic range, WDR, images) based on pairs of image data frames that is acquired with different exposure times (in different iterations of the image processing) within the pair. This is a well-known technique for producing HDR images and can be extended to include a base with a larger number of image data frames acquired with different exposure times. The image data frames are handled by the image pipeline 1 successively in pairs, meaning that the iterations are performed alternately. Consequently, consecutive image frames, e.g. image frames 301-0 and 301-1, in the image data stream 3 forms an image pair that are to form a common HDR image. The consecutive image frames are acquired with different exposure times. The exposure time is handled by the exposure time component 101.

For this type of application, where image data is processed in iterations, a plurality of settings 1003 divided into a first group of settings ($E2_0+G2_0$), for exposure time and gain settings for iteration 0, and a second group of settings ($E2_1+G2_1$), for exposure time and gain settings for iteration 1, are formed by the control unit 22. By handling the group of settings as sub-groups of settings forming a common group of settings 1003, it may be avoided that a setting for a component takes effect between processing of images of the same pair. This advantage is based on a functionality that a component finishes the processing of a current setting before applying a next setting package. In other words, a component in the image pipeline 1 will finish processing a complete cycle of iterations, for example both iteration 0 and 1, with a current group of settings before applying a next group of settings, even if the next group is received in the middle of the iteration cycle. Hence, the component will not change settings between iteration 0 and 1 for the example given above.

The plurality of settings 1003 is associated with a tag in the form of an ID number "2", for reasons explained in connection to previously disclosed embodiments. Moreover, when providing feedback from the image pipeline 1, e.g. from the gain component 102, regarding image data processed with a setting, information of which iteration that image data is of is also sent in association. To exemplify, the gain component 102 in FIG. 10 may send feedback to the control unit 22 including the ID number "1" and iteration number "0", indicating that the feedback relates to image data (e.g. image frame 3010 or image frame 302-0) of iteration 0 processed with settings tagged with 1. The control unit 22 receives the feedback together with the tag and the iteration information, and then knows which settings that have been active at the processing. Based on this information, the control unit 22 may determine an adjustment of settings (the same or other type of settings) for the same iteration and include with settings of other iterations that may be determined based on other feedback. In the illustrated example, the control unit 22 has prepared an adjusted plurality of settings 1003. The control unit has adjusted the exposure and gain setting for iteration "0" based on feedback tagged with the ID number "1" and iteration number "0". The control unit has further adjusted the exposure and gain setting for iteration "1" based on feedback tagged with ID "1" and iteration number "1". In other words, the control unit 22 is provided with reliable information of the origin of the feedback, also in this complex scenario, and can therefore make a detailed adjustment for settings of a specific iteration rather than making a general adjustment which has effect on all iterations.

Figure 11:
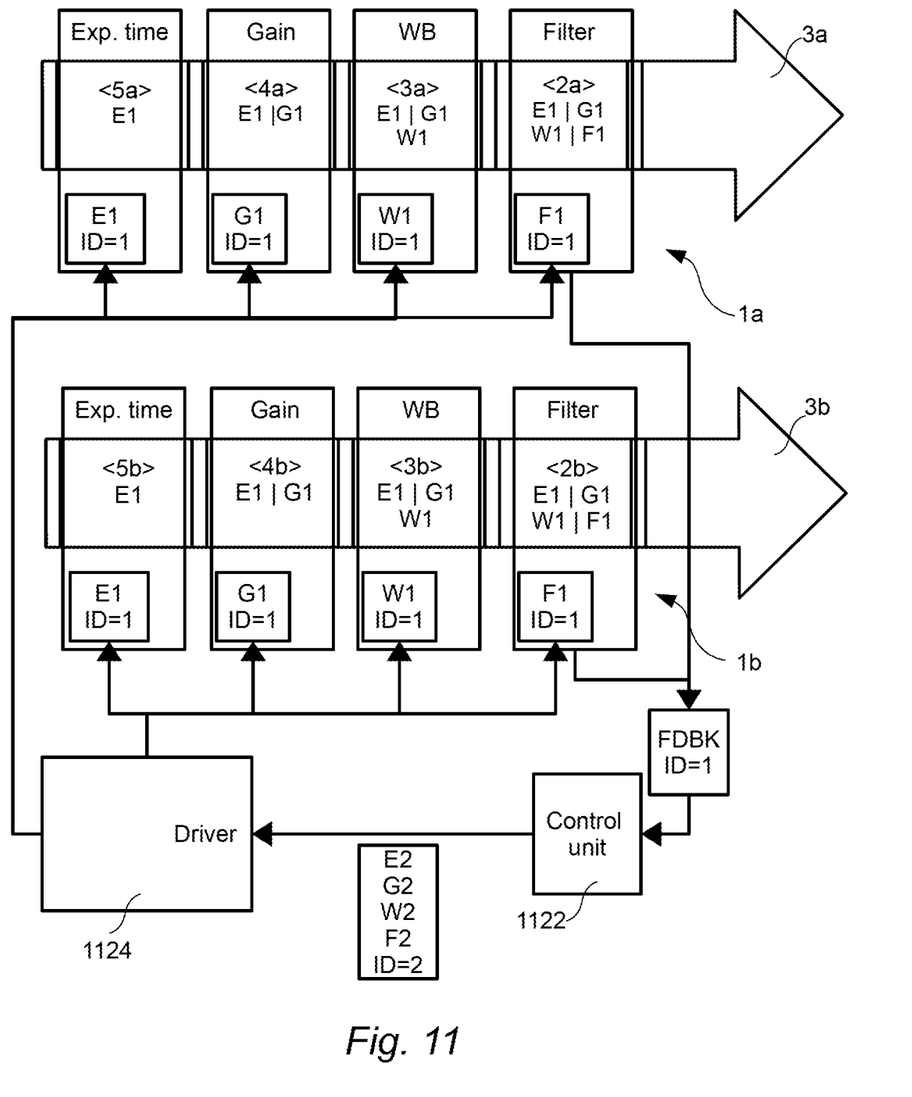
FIG. 11 illustrates an implementation of embodiments to a system with a plurality of image pipelines.

According to one embodiment, the method of determining adjustment of settings is implemented in a system with a plurality of image pipelines. FIG. 11 illustrates an example of such a system including a first image pipeline 1a and a second image pipeline 1b. The first image pipeline 1a processes a first image data stream 3a with image frame parts 2a-5a, and the second image pipeline processes a second image data stream 3b with image frame parts 2b-5b.

Similar to embodiments having a single image pipeline, a control unit 1122 and a driver 1124 are arranged to determine and transmit one or more settings to the image pipelines 1a, 1b. The system is configured to update both (or all in the case of more pipelines) image processing pipelines 1a, 1b with the same settings. This can be seen in FIG. 11, where, e.g., an exposure time component of the first image pipeline 1a has the same setting E1, with the same tag ID=1, as an exposure time component of the second image pipeline 1b. The purpose of the same setting is to avoid dissimilarities in a resulting image due to the separated image processing, which is a problem when processed image data is combined, or stitched, to form a single resulting image.

Feedback is provided to the control unit 1122 from both image processing pipelines 1a, 1b. In the illustrated example, the filter component of the first image pipeline 1a and the filter component of the second image pipeline 1b provides feedback FDBK with the tag ID=1 to the control unit 1122.

The tag or the feedback may further include an indication (not illustrated) of which image pipeline the feedback relates to. Alternatively, the same setting may be associated with different tags for different image pipelines 1a, 1b to separate the received feedback between different pipelines.

The image pipelines 1a, 1b may be configured to process different parts of image data that is acquired by a single sensor. Alternatively, the image pipelines 1a, 1b may be configured to process image data from different image sensors that are configured to produce a single image. The image data from different image sensor may thus be combined, e.g., by stitching to form a single image. The stitching may be performed after processing by the different image pipelines 1a, 1b.

Each image pipeline may be associated with an image processing chip that performs the image processing.

It is understood that the above example extends to the case where more than two different exposures are used to form an HDR image. In that case, the plurality of settings may include more than two groups of settings which are used alternately in more than two iterations.

Another more complex scenario, for which the concept also works well, is when having a multi-channel image pipeline processing images from different image sensors. In one example of a multi-channel image pipeline, image data from different sensors, forming different image channels, are processed alternately, similar to the example of different iterations of image data processing given above.

A corresponding embodiment of the method, as in the case with the forming of HDR images, may be applied here. Namely, the one or more settings may comprise a plurality of settings divided into different groups for being applied in processing of image data of different image data channels. A first group may be applied when processing a first image data channel, a second group may be applied when processing a second image data channel, etc. When providing feedback from the image pipeline 1, information of which channel processed image data is of may be associated with feedback of that processed image data and with the tag of plurality of settings.

As evident from the variety of examples provided herein, it is appreciated that a person skilled in the art can modify the above-described embodiments in many ways and still use the advantages of the teachings as shown in the embodiments above. For example, feedback may include several tags corresponding to different settings or groups of settings that are sent to different components of the image pipeline. In other words, feedback may include several tags of different group of settings which have been active in parallel in different parts of the image pipeline when processing the same frame. Moreover, as exemplified, the inventive concept may be adapted to be applied for parallel image pipelines, which process image data in parallel, with a common controller determining pluralities of settings for several pipelines. Feedback may in such a case be associated with a tag and, in addition, an indication of which image pipeline the feedback relates to.

Thus, the teachings should not be limited to the shown embodiments but should only be defined by the appended claims. Additionally, as the skilled person understands, the shown embodiments may be combined.

The invention claimed is:

1. A method of determining adjustment of an image pipeline setting, the method comprising;
   determining, by a controller, one or more settings for image data processing in an image pipeline,
   associating the one or more settings with a tag,
   transmitting the one or more settings to the image pipeline, wherein the tag is transmitted in association with the one or more settings,
   determining a feedback regarding image data processed with the one or more settings,
   transmitting, from the image pipeline to the controller, the feedback, wherein the tag is transmitted in association with the feedback, and
   determining, based on the received feedback and the one or more settings associated with the tag, an adjustment of the image pipeline setting.

2. The method according to claim 1,
   wherein the one or more settings comprises a group of settings,
   wherein the method further comprises determining a timing for applying the group of settings such that each of the settings takes effect for processing of same image data, and
   wherein the group of settings is transmitted to the image pipeline according to the determined timing, the tag being transmitted in association with at least one setting in the group of settings.

3. The method according to claim 2, wherein the same image data corresponds to a same image frame or image frame part.

4. The method according to claim 2, wherein the tag is transmitted in association with each setting in the group of settings to different image processing components of the image pipeline.

5. The method according to claim 2, wherein the tag is transmitted, in association with a first setting of the one or more settings, to an image processing component in the image pipeline, and wherein the tag is transmitted to later image processing components via image data.

6. The method according to claim 1, wherein the tag comprises unique data identifying the one or more settings.

7. The method according to claim 1, wherein the feedback comprises image statistics, such as block level data or histogram data.

8. The method according to claim 1, wherein the feedback comprises processed image data.

9. The method according to claim 1, wherein the one or more settings are transmitted to image pipeline components of the image pipeline being selected from the group of: exposure, gain, pre-processing, white balance, filtering, post-processing, and encoding.

10. The method according to claim 1,
wherein the one or more settings comprises a first group of settings and a second group of settings for being applied in processing of image data of a first iteration and a second iteration, respectively, and
wherein the method further comprises transmitting, in association with the feedback and the tag, information of which iteration the processed image data is of.

11. The method according to claim 10, wherein the image pipeline is adapted to produce high dynamic range images based on the image data acquired with different exposure times in the different iterations.

12. A system for determining an adjustment of an image pipeline setting, the system comprising:
an image pipeline adapted to process image data, and
a circuitry of a controller adapted to
determine one or more settings for image data processing in the image pipeline,
associate the one or more settings with a tag,
transmit the one or more settings to the image pipeline, and
transmit the tag in association with the one or more settings,
wherein the image pipeline is further adapted to
determine a feedback regarding image data processed with the one or more settings,
transmit the feedback to the controller, and
transmit the tag in association with the feedback, and
wherein the controller is further adapted to
determine, based on the received feedback and the one or more settings associated with the tag, an adjustment of the image pipeline setting.

13. The system according to claim 12:
wherein the one or more settings comprises a group of settings,
wherein the controller is further adapted to
determine a timing for applying the group of settings such that each of the settings takes effect for processing of same image data,
transmit the one or more settings to the image pipeline by transmitting the group of settings to the image pipeline according to the determined timing, and
transmit the tag in association the with at least one setting in the group of settings.

14. The system according to claim 12, further comprising an image sensor adapted to acquire the image data.

15. The system according to claim 12, wherein the image pipeline is adapted to perform image data processing selected from the group of: exposure, gain, pre-processing, white balance, filtering, post-processing, and encoding.

* * * * *